United States Patent
Park et al.

(10) Patent No.: US 11,666,849 B2
(45) Date of Patent: Jun. 6, 2023

(54) FILTER MODULE AND AIR PURIFIER HAVING THE SAME

(71) Applicant: SAMSUNG ELECTRONICS CO., LTD., Suwon-si (KR)

(72) Inventors: Dah We Park, Suwon-si (KR); Gi Hoon Ko, Suwon-si (KR); Yeon-Young Nam, Suwon-si (KR); Ji Hyeong Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 363 days.

(21) Appl. No.: 16/764,994

(22) PCT Filed: Nov. 16, 2018

(86) PCT No.: PCT/KR2018/014146
§ 371 (c)(1),
(2) Date: May 18, 2020

(87) PCT Pub. No.: WO2019/098776
PCT Pub. Date: May 23, 2019

(65) Prior Publication Data
US 2020/0398207 A1    Dec. 24, 2020

(30) Foreign Application Priority Data

Nov. 16, 2017  (KR) .................. 10-2017-0152882
Nov. 16, 2018  (KR) .................. 10-2018-0141757

(51) Int. Cl.
*B01D 46/00*   (2022.01)
*B01D 46/18*   (2006.01)
(Continued)

(52) U.S. Cl.
CPC ......... *B01D 46/18* (2013.01); *B01D 46/0002* (2013.01); *B01D 46/0028* (2013.01);
(Continued)

(58) Field of Classification Search
CPC ........ B01D 46/18; B01D 46/62; B01D 46/66; B01D 46/0002; B01D 46/0032;
(Continued)

(56) References Cited

U.S. PATENT DOCUMENTS 3,695,008 A * 10/1972 Neumann .............. B01D 46/18
                                                55/501
4,321,064 A *  3/1982 Vargo .................... B01D 45/08
                                                55/354

(Continued)

FOREIGN PATENT DOCUMENTS

JP    08-285363 A    11/1996
JP    11-33325      2/1999
(Continued)

OTHER PUBLICATIONS

International Search Report dated Mar. 14, 2019 from International Application No. PCT/KR2018/014146, 5 pages.
(Continued)

*Primary Examiner* — T. Bennett McKenzie
(74) *Attorney, Agent, or Firm* — Staas & Halsey LLP

(57) ABSTRACT

A filter module and an air purifier according to an aspect of the present disclosure include a supply roller and a recovery roller, a filter wound and installed on the supply roller and the recovery roller, so that it can be used without replacing and cleaning the filter module for a long period of time by allowing a section used in the filter to be recovered in the recovery roller, and also a section not used in the filter to be supplied from the supply roller.

15 Claims, 18 Drawing Sheets

(51) Int. Cl.
  *B01D 46/12* (2022.01)
  *F24F 3/16* (2021.01)
  *F24F 13/28* (2006.01)
  *B01D 46/62* (2022.01)
  *B01D 46/66* (2022.01)

(52) U.S. Cl.
  CPC ..... *B01D 46/0032* (2013.01); *B01D 46/0038* (2013.01); *B01D 46/12* (2013.01); *B01D 46/62* (2022.01); *B01D 46/66* (2022.01); *F24F 3/16* (2013.01); *F24F 13/28* (2013.01); *B01D 2265/023* (2013.01); *B01D 2265/028* (2013.01)

(58) Field of Classification Search
  CPC ................ B01D 46/0038; B01D 46/12; B01D 2265/023; B01D 2265/028; F24F 3/16; F24F 13/28
  USPC .............................................................. 95/57
  See application file for complete search history.

(56) References Cited

U.S. PATENT DOCUMENTS

| | | | | |
|---|---|---|---|---|
| 4,894,071 A * | 1/1990 | Klein | ..................... | B01D 46/20 55/354 |
| 5,704,953 A * | 1/1998 | Stemmer | ............. | B01D 46/521 55/497 |
| 6,019,816 A * | 2/2000 | Lim | ................... | B01D 53/0415 95/94 |
| 6,152,998 A * | 11/2000 | Taylor | ................. | B01D 46/444 96/429 |
| 6,160,234 A * | 12/2000 | Wehrli, III | ........... | H01H 3/3021 200/400 |
| 6,402,822 B1 * | 6/2002 | Najm | ................... | B01D 46/446 96/429 |
| 7,101,420 B1 * | 9/2006 | Ellis | ....................... | B01D 47/06 55/482 |
| 2004/0129139 A1 * | 7/2004 | Schumacher | ............ | B60H 3/06 55/354 |
| 2007/0204854 A1 * | 9/2007 | Morton | ............... | F24C 15/2035 126/299 D |
| 2008/0181662 A1 * | 7/2008 | Lee | ..................... | G03G 15/2032 399/126 |
| 2010/0037574 A1 * | 2/2010 | Weber | ................ | B01D 46/0009 55/496 |
| 2011/0030557 A1 * | 2/2011 | Brownstein | .......... | D04H 1/4291 55/501 |
| 2011/0061537 A1 * | 3/2011 | Sullivan | ................. | B01D 46/22 96/429 |
| 2012/0055339 A1 * | 3/2012 | Schumacher | ........ | B01D 46/185 55/354 |
| 2013/0186050 A1 | 7/2013 | Skopis | | |
| 2013/0291502 A1 * | 11/2013 | Gorman | ................... | F16L 23/16 277/616 |
| 2014/0373719 A1 * | 12/2014 | Spiegel | .............. | B01D 46/0038 55/354 |

FOREIGN PATENT DOCUMENTS

| | | |
|---|---|---|
| JP | 11-197229 A | 7/1999 |
| KR | 10-2003-0010090 A | 2/2003 |
| KR | 10-2012-0029490 | 3/2012 |
| KR | 10-2016-0022434 A | 3/2016 |
| KR | 10-1633789 B1 * | 6/2016 |
| KR | 10-1654160 | 10/2016 |

OTHER PUBLICATIONS

Office Action dated Jan. 6, 2023 issued in Korean Application No. 10-2018-0141757.

* cited by examiner

FILTER MODULE AND AIR PURIFIER HAVING THE SAME

CROSS-REFERENCE TO RELATED APPLICATIONS

This application is a U.S. National Stage Application which claims the benefit under 35 U.S.C. § 371 of International Patent Application No. PCT/KR2018/014146 filed on Nov. 16, 2018, which claims foreign priority benefit under 35 U.S.C. § 119 of Korean Patent Application No. 10-2017-0152882 filed on Nov. 16, 2017 and Korean Patent Application No. 10-2018-0141757 filed on Nov. 16, 2018 in the Korean Intellectual Property Office, the contents of each of which are incorporated herein by reference.

TECHNICAL FIELD

The present disclosure relates to a filter module that collects foreign substances in the air through a filter and an air purifier equipped with the same.

BACKGROUND ART

An air purifier serves to reduce fine foreign substances such as dust by collecting foreign substances contained in indoor air.

The air purifier includes a main body provided with an inlet and an outlet, a blower that is disposed inside the main body to allow indoor air to be sucked into the main body and then discharged back into an interior space, and a filter for collecting foreign substances contained in the air introduced into the interior space.

The filter may include a pre-filter, HEPA filter, and electrostatic filter.

However, the filter has a different service life depending on its type, and particularly, in the case of the pre-filter, since large-sized foreign substances are mainly collected among foreign substances introduced into the interior space, a maintenance cycle is relatively short compared to other types of filters, so it must be cleaned frequently.

DISCLOSURE

Technical Problem

Therefore, it is an aspect of the disclosure to provide an air purifier that can be used without replacing or cleaning the filter for a long period of time.

Technical Solution

In accordance with one aspect of the disclosure, an air purifier includes: a main body comprising an inlet through which air is sucked; and a filter module installed to be replaceable inside the inlet, and the filter module includes a supply roller and a recovery roller, and a filter on which both ends of the filter are wound and installed on the supply roller and the recovery roller.

The air purifier may further include: a drive device configured to drive the supply roller and the recovery roller.

The drive device may include a drive motor configured to generate a rotational force, a drive pulley connected to an axis of the drive motor, a driven pulley connected to an axis of the recovery roller, and a timing belt configured to transmit the rotational force from the drive pulley to the driven pulley.

The filter module may further include a latch device disposed on at least one of the supply roller and the recovery roller to limit reverse rotation.

The latch device includes a latch gear connected to any one axis of the supply roller and the recovery roller, a latch lever engaged the gear to limit the reverse rotation of the gear, and a latch spring elastically supporting the latch lever.

The filter module may further include a filter housing in which the supply roller and the recovery roller are rotatably installed, and the filter housing may include a supply part accommodating the supply roller, a recovery part accommodating the recovery roller, and an opening provided to correspond to the inlet between the supply part and the recovery part.

The filter may include a filter part configured to collect foreign substances, and two cover parts connected to both ends of the filter part to cover the opening.

The filter may include at least one of a pre-filter, a HEPA filter, a deodorizing filter and an antibacterial filter.

The main body may further include an electrostatic filter disposed in front of the filter.

The filter may include a pre-filter, and the filter module may further include a HEPA filter disposed behind the pre-filter.

The main body may further include a main housing provided with an opening on the front surface, and a movable housing provided with the inlet on the front surface and movably installed in the opening of the main housing.

The movable housing may include a filter installation part provided in a slot shape on the side of the movable housing and in which the filter module is detachably installed.

The filter module may include a supply housing accommodating the supply roller, and a recovery housing accommodating the recovery roller and detachably coupled to the supply housing.

The filter module may include permanent magnets disposed in the supply housing and the recovery housing, respectively.

The air purifier may further include: a permanent magnet disposed in one of the supply housing and the recovery housing, and a metal plate disposed in the other.

The main body may include a main housing with an opening on the front surface, and a suction cover provided with an inlet and detachably installed in the main housing to cover the opening of the main housing, and the supply housing and the recovery housing may be detachably coupled inside the opening.

The main body may include an ultraviolet lamp provided at the bottom of the front surface, and the recovery housing may include a transparent window provided at a position corresponding to the ultraviolet lamp.

In accordance with another aspect of the disclosure, a filter module includes: a filter; a supply roller in which a section before use in the filter is wound; a recovery roller in which a section after being used in the filter is wound; a supply housing accommodating the supply roller; and a recovery housing accommodating the recovery roller and detachably coupled to the supply housing.

Advantageous Effects

As described above, a filter module according to an aspect of the present disclosure and an air purifier equipped with the same include a filter wound on a supply roller and a recovery roller, and can be used without replacing and cleaning the filter module for a long period of time by allowing the used section containing a sufficient amount of foreign substances in the filter to be recovered on the recovery roller and unused section in the filter to be supplied from the supply roller.

MODE OF THE INVENTION

The terms used herein are used to describe the embodiments and are not intended to limit the disclosure. The singular forms "a," "an" and "the" are intended to include the plural forms as well, unless the context clearly indicates otherwise. In this disclosure, the terms "including," "having," and the like are used to specify features, numbers, steps, operations, elements, components, or combinations thereof, but do not preclude the presence or addition of one or more of the features, elements, steps, operations, elements, components, or combinations thereof.

Figure 1:
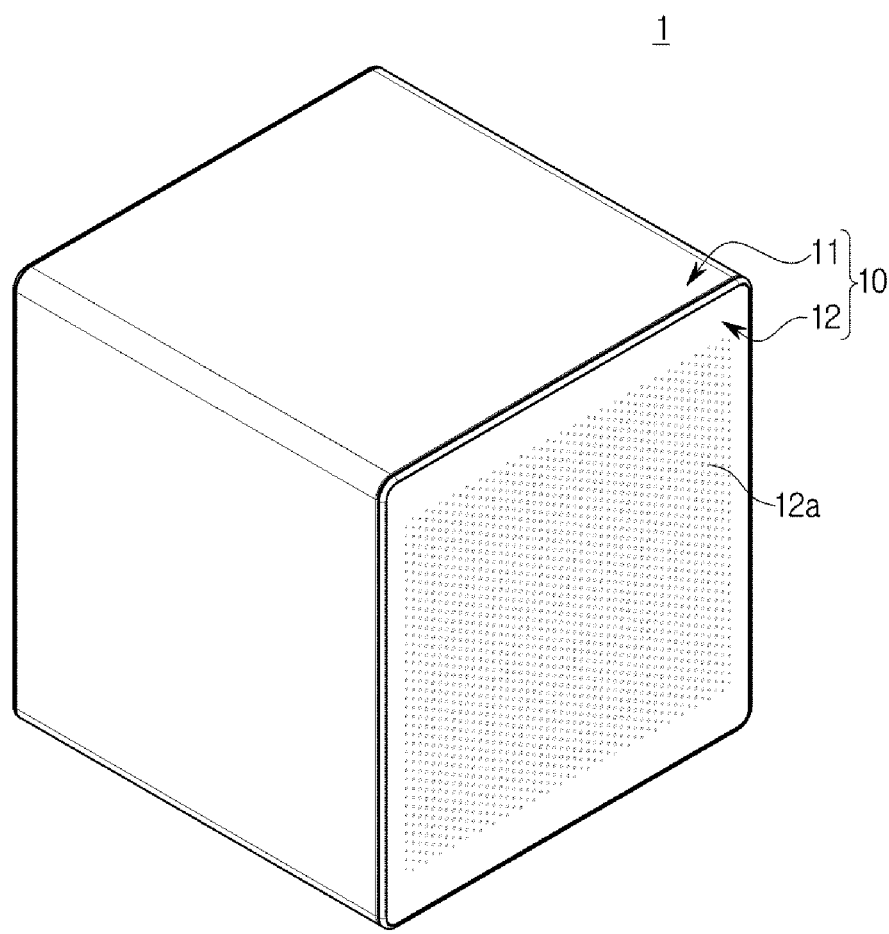
FIG. 1 is a perspective view of an air purifier according to a first embodiment of the present disclosure.
Figure 2:
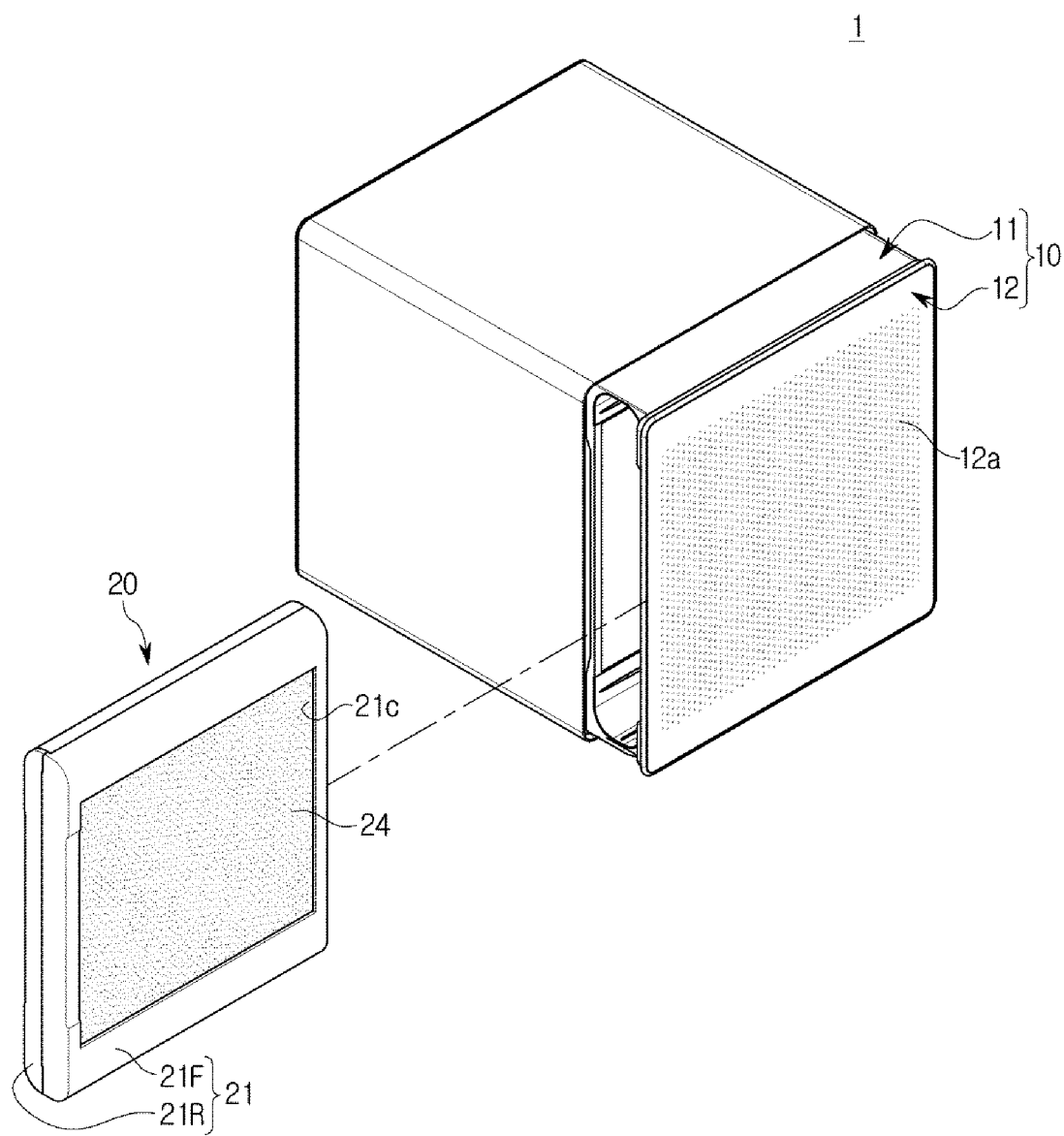
FIG. 2 is a perspective view of a filter module in an exploded state in an air purifier according to a first embodiment of the present disclosure.

An air purifier according to the first embodiment of the present disclosure, as shown in FIGS. 1 and 2, includes a main body 10 forming its appearance and a filter module 20 detachably installed on the main body 10.

The main body 10 includes an inlet 12a through which air is sucked and an outlet (not shown) through which air is discharged. The main body 10 includes a main housing 11 formed in the shape of a rectangular enclosure and has an open front surface, a movable housing 12 movably installed in the main housing 11, and a filter drive device 13 (see FIG. 3) for operating the filter module 20.

Although not shown in the drawing, the main housing 11 includes a blower that allows air to be sucked into the main body and then discharged again, and a transfer device for moving the movable housing 12. In addition, the main housing 11 may include the outlet provided on the rear surface or the upper surface so that air purified through the air purifier is discharged to the outside.

The movable housing 12 is formed in the shape of a rectangular enclosure with an open rear surface, and is formed smaller than the main housing 11 so as to be movable back and forth in the opening of the main housing 11. The movable housing 12 has a front surface forming the front surface of the main body 10, and a plurality of the inlets 12a provided on the front surface of the movable housing 12 are provided.

The movable housing 12 includes a filter installation part 12b provided in a shape corresponding to the filter module 20 on one side of the movable housing 12 and in which the filter module 20 is detachably installed. The filter installation part 12b is provided in an open slot shape toward one side of the movable housing 12.

Therefore, when it is necessary to replace the filter module 20, when the movable housing 12 is moved forward through the transfer device, the movable housing 12 protrudes forward from the main housing 11 and is exposed to the outside of the side of the movable housing 12. Since one side of the movable housing 12 is provided with the filter installation part 12b, the filter module 20 installed in the filter installation part 12b may be separated and the new filter module 20 may be installed again in the filter installation part 12b. That is, the filter module 20 may be replaced.

After the replacement of the filter module 20 is completed, when the movable housing 12 is moved rearward through the transfer device, the movable housing 12 is received again in the main housing 11 and the replacement of the filter module 20 is thus completed.

Figure 4:
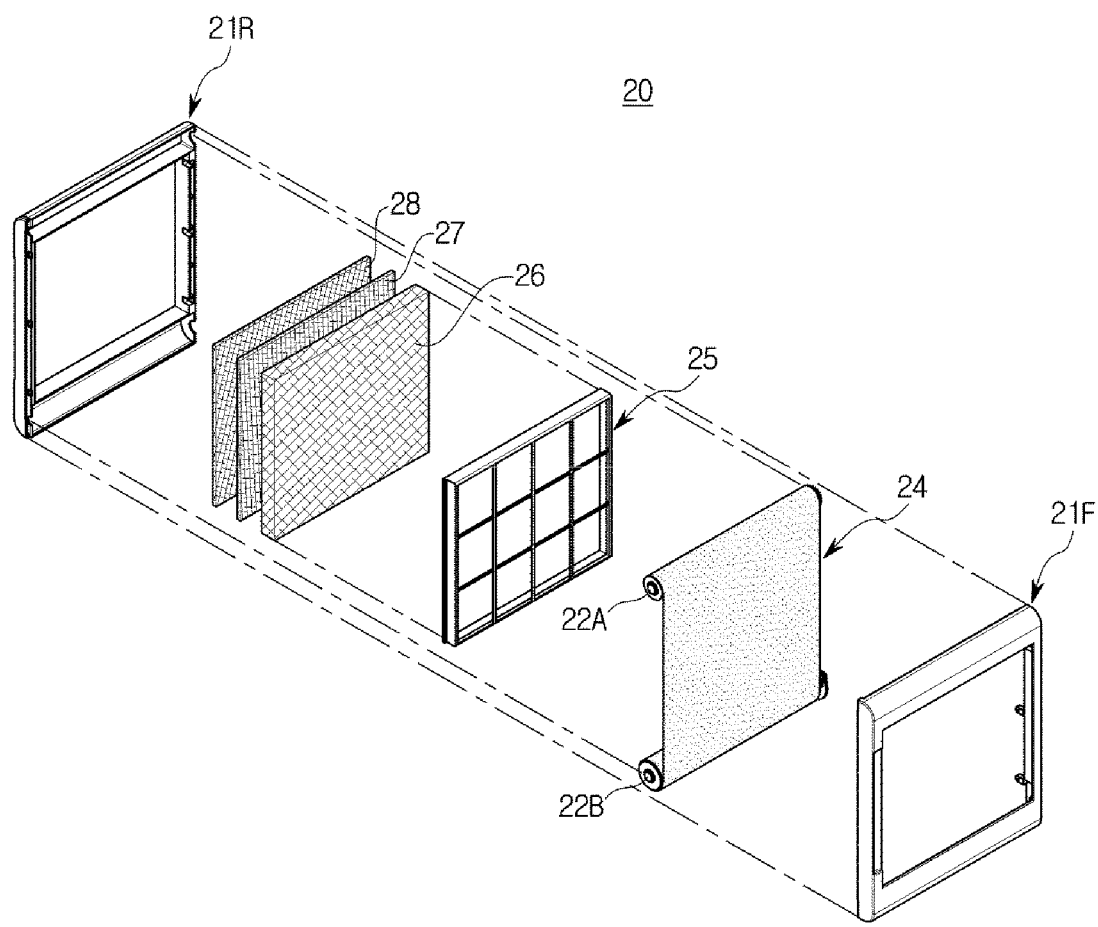
FIG. 4 is an exploded perspective view of a filter module applied to an air purifier according to a first embodiment of the present disclosure.
Figure 5:
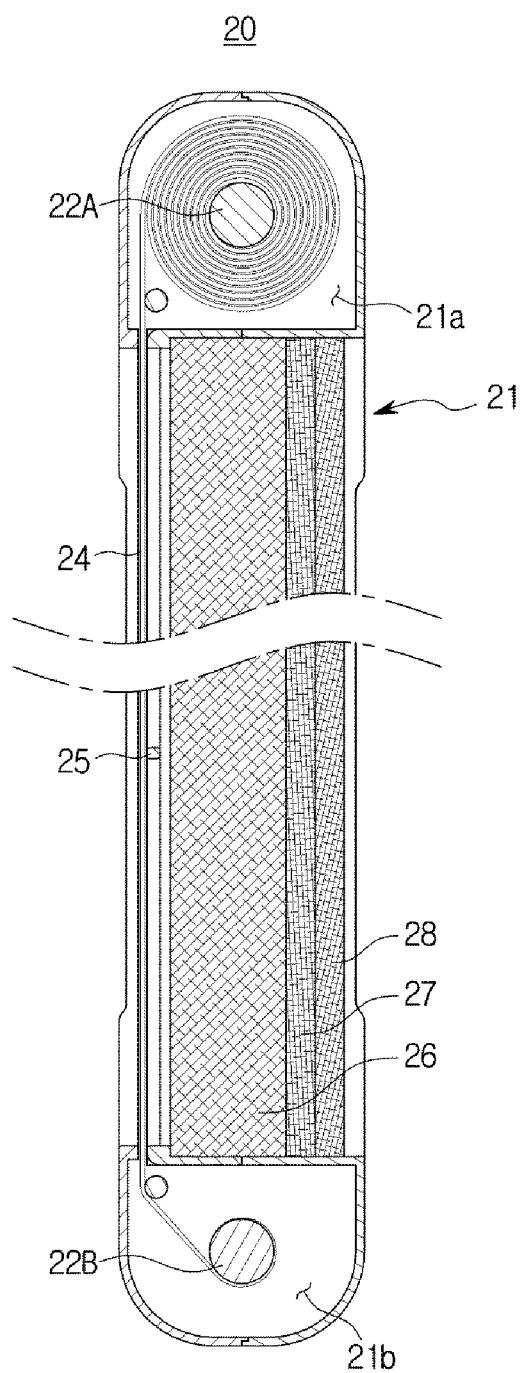
FIG. 5 is a cross-sectional view of a filter module applied to an air purifier according to a first embodiment of the present disclosure.

The filter module 20 includes, as shown in FIGS. 4 and 5, a filter housing 21 forming an exterior and forming an opening 20a through which air may pass, a supply roller 22A and a recovery roller 22B spaced apart vertically in the filter housing 21, a pre-filter 24 wound and installed on the supply roller 22A and the recovery roller 22B, and a support member 25 disposed in the opening 20a to support the rear side of a collecting part of the pre-filter 24. In this embodiment, the supply roller 22A is accommodated in an upper part of the filter housing 21, and the recovery roller 22B is accommodated in a lower part of the filter housing 21.

The supply roller 22A and the recovery roller 22B are spaced apart vertically, but this is an example, and it is also possible for the supply roller 22A and the recovery roller 22B to be spaced apart from side to side.

In addition, the filter module 20 further includes a HEPA filter 26, a deodorizing filter 27, and an antibacterial filter 28, which are sequentially arranged behind the pre-filter 24. In addition, although not shown in the drawings, the main body 10 may further include an electrostatic filter disposed in front of the pre-filter 24 to capture foreign substances.

In the above, the filter module 20 includes the pre-filter 24, the HEPA filter 26, the deodorizing filter 27, and the antibacterial filter 28, which is an example, and it is also possible that the filter module 20 includes only the pre-filter 24 and the HEPA filter 26. In addition, the filter module includes only the pre-filter, and the rest of the filters may be installed in the main body separately from the filter module.

In addition, the pre-filter 24 collects the largest foreign substances, so it is preferable to be placed on the outermost side, but the arrangement order of the HEPA filter 26, the deodorizing filter 27 and the antibacterial filter 28 may be changed according to design.

The filter housing 21 includes a front housing 21F and a rear housing 21R that are coupled to each other front to back to receive the supply roller 22A, the recovery roller 22B, and the pre-filter 24 therein.

The filter housing 21 includes a supply part 21a provided to be partitioned on top of the filter housing 21 and accommodating the supply roller 22A, a recovery part 21b provided to be partitioned in a lower portion of the filter housing 21 and accommodating the recovery roller 22B, and a through portion 21a provided between the supply part 21a and the supply part 21a and through which air sucked through the inlets 12a passes.

The pre-filter 24 is a filter that mainly collects relatively large foreign substances among foreign substances contained in the air. In the pre-filter 24, a section before use is wound on the supply roller 22A, and a section after use is wound on the recovery roller 22B. The section between the supply roller 22A and the recovery roller 22B in the pre-filter 24 is disposed at the rear of the inlets 12a, forming the collecting part for collecting the actual foreign substances.

Figure 6:
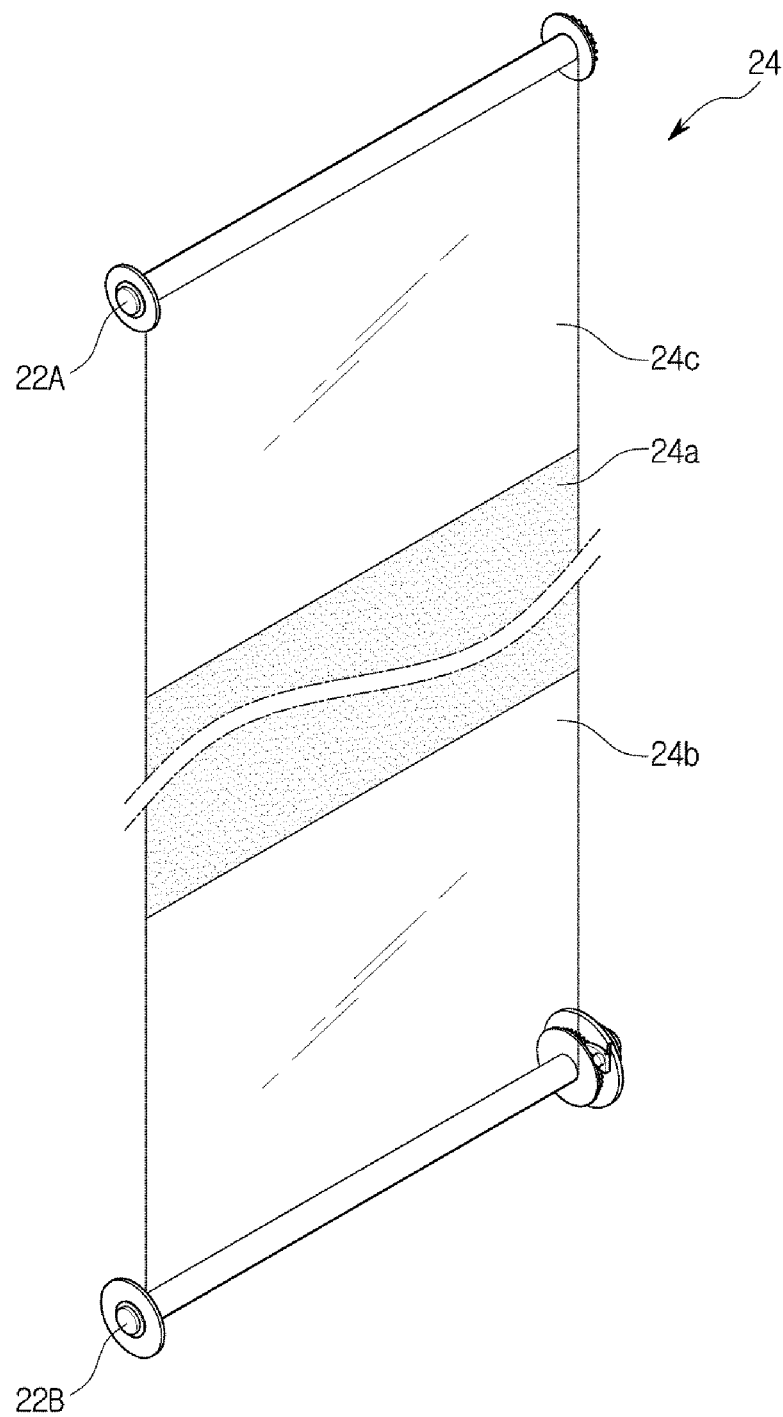
FIG. 6 is a perspective view of a filter applied to an air purifier according to a first embodiment of the present disclosure.

The pre-filter 24 includes, as shown in FIG. 6A, a filter part 24a that is formed in a mesh form to collect foreign substances and two cover parts 24b and 24c connected to both ends of the filter part 24a to cover the opening 20a of the filter module 20.

The filter part 24a is formed in the mesh form to allow air to pass through and filter foreign substances.

The cover parts 24b and 24c are formed of a film formed by resin to cover the opening 20a of the filter module 20 to block the inflow of air and foreign substances through the opening 20a. The cover parts 24b and 24c include the first cover part 24b that covers the opening 20a of the filter module 20 before being used and the second cover part 24c that covers the opening 20a of the filter module 20 where all the filter parts 24a are used to prevent foreign substances from flowing through the opening 20a. The first cover part 24b is located on the recovery roller 22B side around the filter part 24a, and the second cover part 24c is located on the supply roller 22A side around the filter part 24a.

Therefore, since the filter module 20 before use has the opening 20a closed by the first cover part 24b, foreign substances are not transmitted to the filters 26, 27, and 28 inside the first cover part 24b, so that the filters 26, 27, and 28 may be kept clean.

In addition, in the case of the filter module 20 in which all the filter parts 24a are used, since the opening 20a is closed by the second cover part 24c, foreign substances collected in the filters 26, 27 and 28 inside the second cover part 24c are prevented from flowing out through the opening 20a, and a user may cleanly separate the used filter module 20 and discard it.

The air introduced into the main body 10 through the inlets 12a passes through the filter part 24a of the pre-filter 24, whereby foreign substances of a large size contained in the air are filtered by the filter part 24a.

In the above, the pre-filter 24 is wound and installed on the supply roller 22A and the recovery roller 22B, but is not limited thereto. Various functional filters, such as the HEPA filter, the deodorizing filter, and the antibacterial filter, may be used in roll form wound on the supply rollers and the recovery rollers.

Referring back to FIGS. 4 and 5, the support member 25 is formed in a substantially rectangular grid shape and is disposed behind the filter part 24a of the pre-filter 24.

Therefore, the filter part 24a of the pre-filter 24 is supported by the support member 25 and prevented from being pushed backwards, but air passes through the support member 25 and is sucked into a rear blower.

Figure 7:
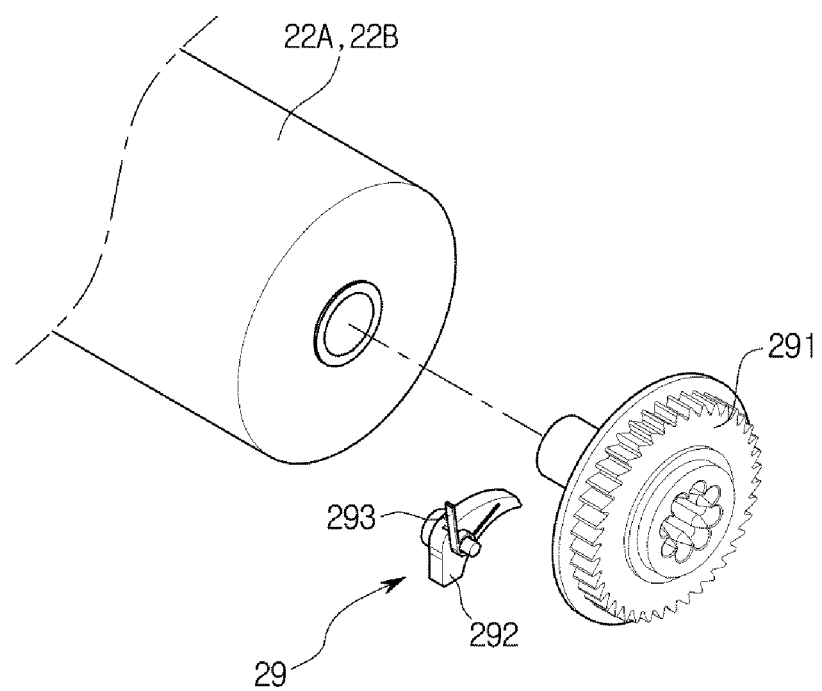
FIG. 7 is an exploded perspective view of a latch device of a filter module applied to an air purifier according to a first embodiment of the present disclosure.
Figure 8:
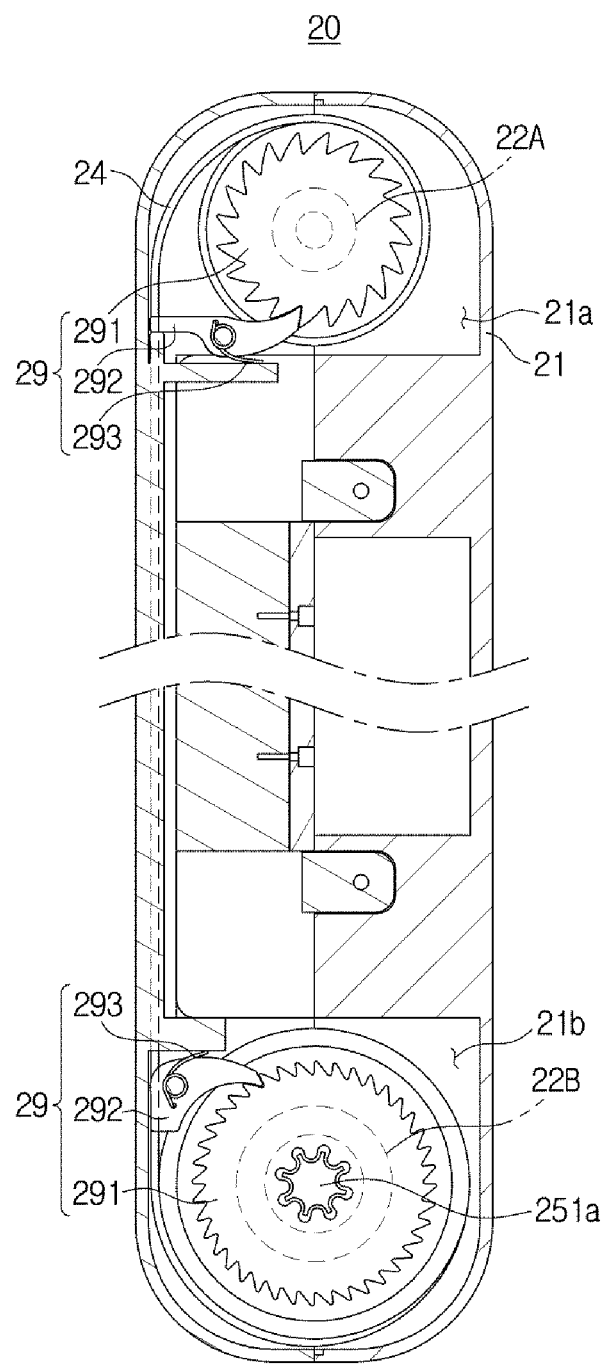
FIG. 8 is a cross-sectional view of a filter module applied to an air purifier according to a first embodiment of the present disclosure, showing an installation state of a latch device.

As shown in FIGS. 7 and 8, the filter module 20 includes a latch device 29 that prevents reverse rotation of the supply roller 22A and the recovery roller 22B.

The latch device 29 includes a latch gear 291 connected to axes of the supply roller 22A and the recovery roller 22B, respectively, a latch lever 292 that allows one-way rotation of the latch gear 291 but restricts reverse rotation and a latch spring 293 elastically supporting the latch lever 292 in one direction.

The latch gear 291 includes a plurality of teeth formed on its outer circumferential surface, which are formed to be inclined in one circumferential direction.

The latch lever 292 extends in the opposite direction to the inclination direction of the teeth of the latch gear 291, and a tip of the latch lever 292 is caught between the teeth. Accordingly, when the latch gear 291 rotates in one direction, the latch lever 292 slides along one side of the inclined teeth, so that the rotation of the latch gear 291 is rotated in one direction. However, when the latch gear 291 is rotated in the reverse direction, the tip of the latch lever 292 is caught by the teeth of the latch gear 291 and interferes with the rotation of the latch gear 291, so that the rotation of the latch gear 291 is not achieved.

The latch spring 293 is made of a torsion spring and is coupled to a hinge axis of the latch lever 292. The latch spring 293 elastically supports the latch lever 292 so that the latch lever 292 contacts the teeth of the latch gear 291.

In this embodiment, the latch device 29 is installed on both the supply roller 22A and the recovery roller 22B, but is not limited thereto, and may also be installed to only one of the supply roller 22A and the recovery roller 22B.

Figure 3:
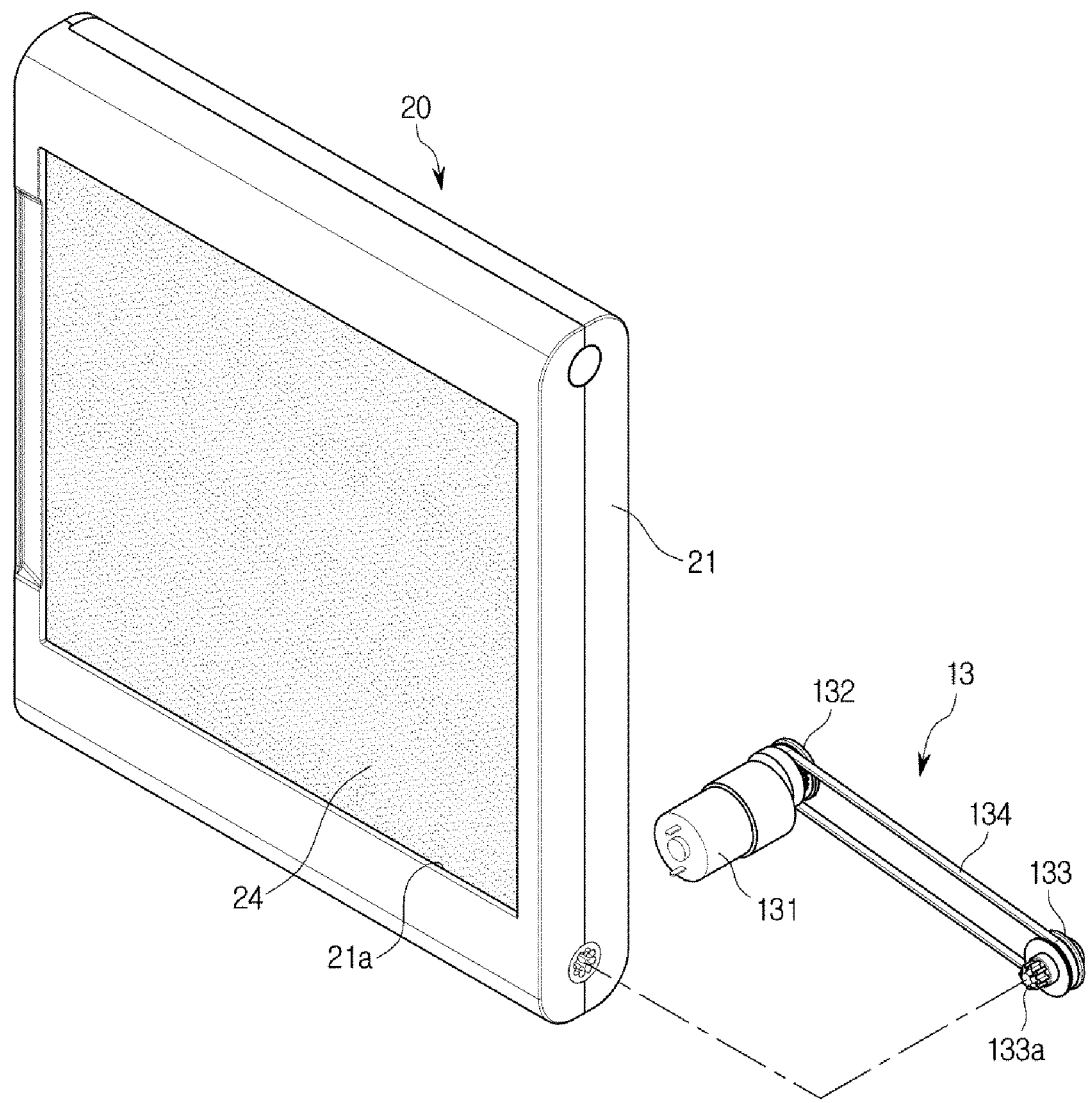
FIG. 3 is a perspective view of a filter module and a filter drive device applied to an air purifier according to a first embodiment of the present disclosure.

The filter drive device 13, as shown in FIG. 3, includes a drive motor 131 for generating a rotational force, a drive pulley 132 connected to an axis of the drive motor 131 and rotated by the drive motor, a driven pulley 133 rotating by receiving the rotational force from the drive pulley 132 and a belt 134 wound and installed on the drive pulley 132 and the driven pulley 133 to transmit the rotational force generated in the drive pulley 132 to the driven pulley 133. In this embodiment, the belt 134 is formed of a timing belt, and the teeth are formed in the drive pulley 132 and the driven pulley 133.

The driven pulley 133 includes a driven coupler part 133a for transmitting a rotational force to the recovery roller 22B, and the latch gear 291 includes a latch coupler part 291a coupled to the driven coupler part 133a for receiving the rotational force from the driven coupler part 133a. Therefore, as the filter module 20 is installed in the filter installation part 12b, the driven coupler part 133a and the latch coupler part 291a are combined.

Although not shown in the drawing, the air purifier includes a sensor for detecting the state of the collecting part of the pre-filter 24 disposed on the back of the inlets 12a and a controller that controls the filter drive device 13 according to the detected pre-filter 24 status The following describes the operation of the air purifier configured as described above.

First, when it is confirmed by the sensor that a foreign substance above a set level is collected in the pre-filter 24, the controller applies power to the drive motor 131.

The rotational force generated in the drive motor 131 is transmitted to the recovery roller 22B through the drive pulley 132, the timing belt 134, and the driven pulley 133 to rotate the recovery roller 22B. The collecting part of the pre-filter 24 collecting foreign substances is recovered by being wound on the recovery roller 22B according to the rotation of the recovery roller 22B. In addition, some of the sections of the pre-filter 24 wound on the supply roller 22A are moved to the rear of the inlets 12a to re-form the collecting part.

After the recovery of the collecting part and the reformation of the collecting part are completed as described above, the controller cuts off the power delivered to the drive motor 131, and accordingly, the collecting part recovery of the filter module 20 and the reformation of the collecting part are completed.

In the above, the filter installation part 12b is provided on one side of the movable housing 12, but is not limited thereto, and it is also possible to provide a filter installation hole on the upper surface of the movable housing 12. In addition, when there is no configuration corresponding to the movable housing, it is also possible to provide a filter installation hole on one side of the main housing.

In addition, the main body 10 includes a drive device 13 for automatically operating the supply roller 22A and the recovery roller 22B, but is not limited thereto. It is also possible for the user to manually rotate the supply roller and the recovery roller through a lever or the like.

In the above, the operation of the filter module 20 is automatically performed by the sensor and the controller, but is not limited thereto, and the user may directly check and proceed with the operation.

Hereinafter, the air purifier according to the second embodiment of the present disclosure will be described in detail with reference to the drawings.

Figure 9:
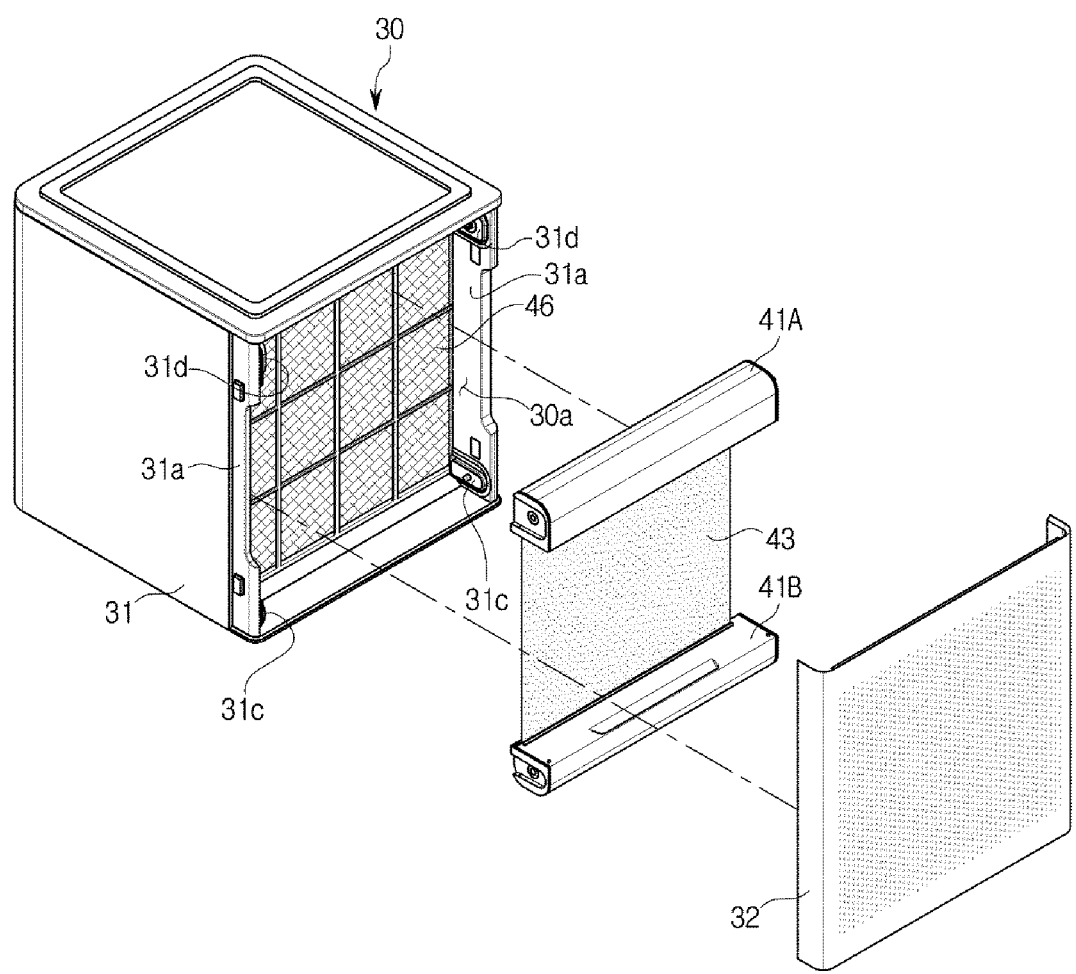
FIG. 9 is an exploded perspective view of an air purifier according to a second embodiment of the present disclosure.

The air purifier according to the second embodiment of the present disclosure, as shown in FIG. 9, includes a main body 30 forming its appearance and a filter module 40 detachably installed on the main body 30. Therefore, the filter module 40 may be replaced.

The main body 30 includes a main housing 31 provided with an opening 30a on the front surface, a suction cover 32 covering the opening 30a of the opened main housing 31 and a drive device (not shown) for operating the filter module 40.

The main housing 31 includes mounting parts 31a provided on both sides of the front surface in which the opening 30a is formed and on which the suction cover 32 is mounted, and coupling guides 31b and 31c provided on inner upper and lower portions of the mounting part 31a and to which a supply housing 40A and a recovery housing 40B of the filter module 40 to be described later are coupled.

The main body 30 includes a HEPA filter 46 disposed inside the opening 30a to capture foreign substances of a fine size. In addition, although not shown in the drawings, various functional filters such as the deodorizing filter and the antibacterial filter may be disposed behind the HEPA filter 46.

The suction cover 32 covers a plurality of inlets 32a to allow air to pass through while covering the opening 30a and is detachably coupled to the main housing 31. Therefore, the filter module 20 may be installed inside the opening 30a of the main housing 31 while the suction cover 32 is separated.

The filter drive device 13 includes the drive motor, the drive pulley, the driven pulley and the timing belt as in the previous embodiment.

The filter module 40 includes a pre-filter 43, a supply roller 42A in which a section before being used in the pre-filter 43 is wound, a recovery roller 42B in which the section used in the pre-filter 43 is wound, the supply housing 40A accommodating the supply roller 42A and the recovery housing 40B accommodating the recovery roller 42B. In addition, the filter module 40 includes a latch device 45 that limits the reverse rotation of the supply roller 42A.

Figure 11:
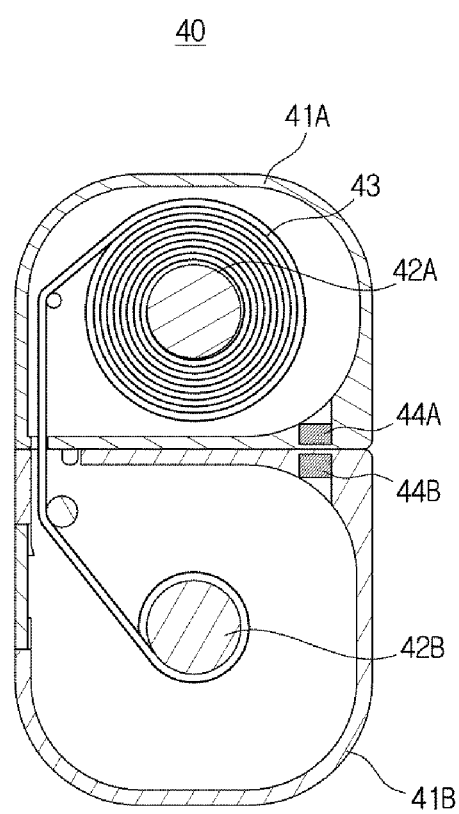
FIG. 11 is a first cross-sectional view of a filter module applied to an air purifier according to a second embodiment of the present disclosure.

The supply housing 40A and the recovery housing 40B are detachably coupled to each other. As shown in the FIG. 11, permanent magnets 44A and 44B are installed in the supply housing 40A and the recovery housing 40B, respectively, and the supply housing 40A and the recovery housing 40B remain coupled to each other by a magnetic force.

Figure 10:
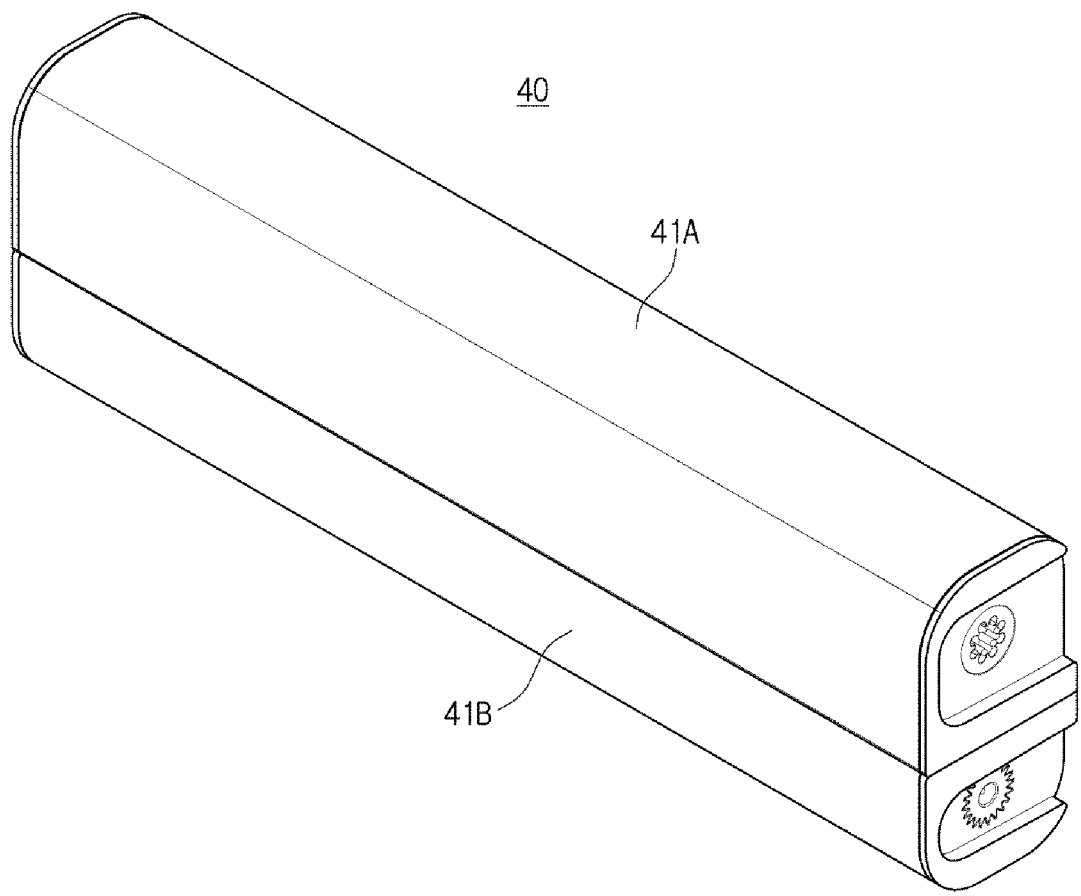
FIG. 10 is a perspective view of a filter module applied to an air purifier according to a second embodiment of the present disclosure.
Figure 12:
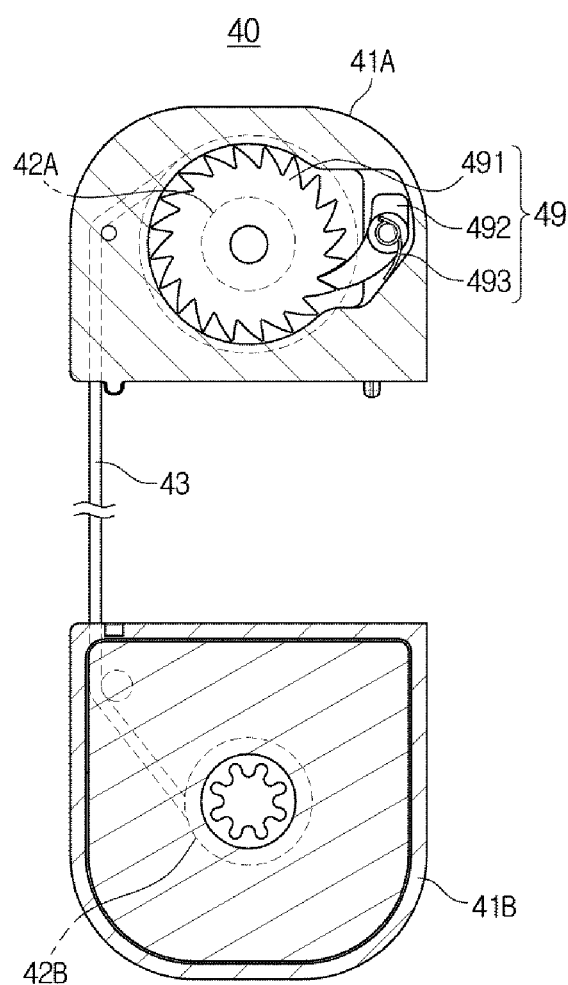
FIG. 12 is a second cross-sectional view of a filter module applied to an air purifier according to a second embodiment of the present disclosure.

Therefore, the supply housing 40A and the recovery housing 40B may remain coupled to each other as shown in FIG. 10 by the magnetic force acting between the permanent magnets 44A and 44B before an external force is applied, and when the external force greater than or equal to the magnetic force is applied, may be separated from each other as illustrated in FIG. 12.

In the above, the permanent magnets 44A and 44B are installed in both the supply housing 40A and the recovery housing 40B, but this is an example. The permanent magnet may be installed only in one of the supply housing 41A and the recovery housing 41B, and a ferromagnetic metal may be installed in the other.

The latch device 45 includes a latch gear 451 connected to an axis of the supply roller 42A, a latch lever 452 that allows one-way rotation of the latch gear 451 but restricts reverse rotation and a latch spring 453 elastically supporting the latch lever 452 in one direction.

Figure 13:
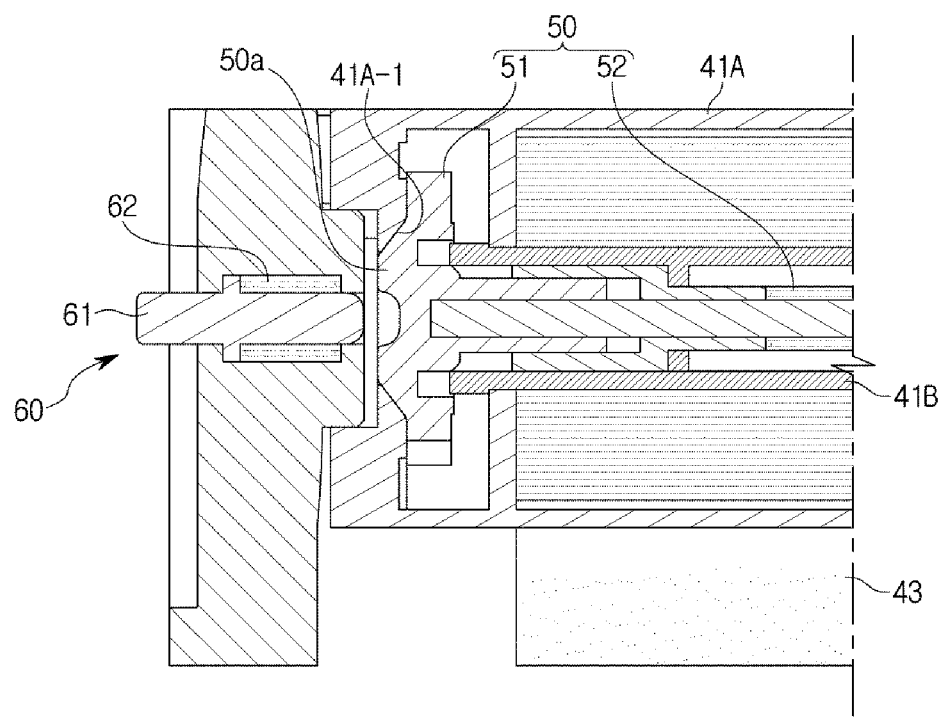
FIGS. 13 and 14 are cross-sectional views showing an operation of a rewind device and a release device applied to an air purifier according to the second embodiment of the present disclosure.
Figure 14:
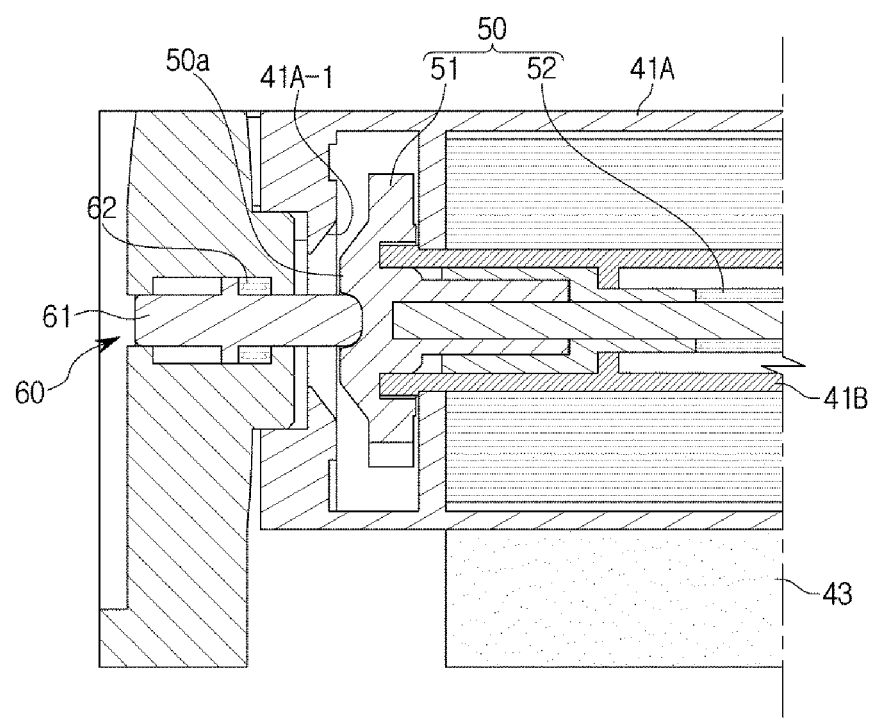

In addition, the filter module 40 includes a rewind device 50 that allows the pre-filter 43 to rewind the supply roller 42A, as shown in FIGS. 13 to 14, and the main housing 31 includes a rewind release device 60 that allows rewinding of the pre-filter 43 to be stopped.

The rewind device 50 includes a locking member 51 rotatably installed on the supply roller 42A and a rewind spring 52 elastically supporting the locking member 51 in the circumferential direction. The locking member 51 is formed in a conical shape and includes a locking part 51a in which a gear is formed on its outer circumferential surface.

The rewind spring 52 is formed in a coil shape, one end of which is fixed to the supply roller 42A and the other end of which is fixed to the locking member 51, and elastically supports the locking member 51 in the circumferential direction with respect to the supply roller 42A.

The recovery part 41A includes a locking hole 41A-1 provided on its side to limit rotation of the locking member 51. The locking hole 41A-1 has an inner surface of a conical shape and has a gear formed on its inner circumferential surface.

The rewind release device 60 includes a release pin 61 that is movably installed in the mounting part 31a of the main housing 31 and a release spring 62 that elastically supports the release pin 61. The release pin 61 is elastically supported so that an outer end protrudes outward from the mounting part 31a by the release spring 62.

Therefore, before the suction cover 32 is mounted on the mounting part 31a, the pre-filter 43 is maintained in a state where the pre-filter 43 can be rewound to the supply roller 42A by an elastic restoring force of the rewind spring 52.

When the suction cover 32 is attached to the mounting part 31a, as the release pin 61 moves by the suction cover 32, the inner end of the release pin 61 protrudes inside the mounting part 31a. The locking member 51 is moved inward by the release pin 61, and as the locking member 51 moves, the locking part 51a of the locking member 51 is separated from the locking hole 41A-1. The locking member 51 rotates by the elastic restoring force of the rewind spring 52. When the rotation of the locking member 51 by the rewind spring 52 is completed, the rewind operation of the pre-filter 43 by the rewind device 50 is stopped.

Figure 15:
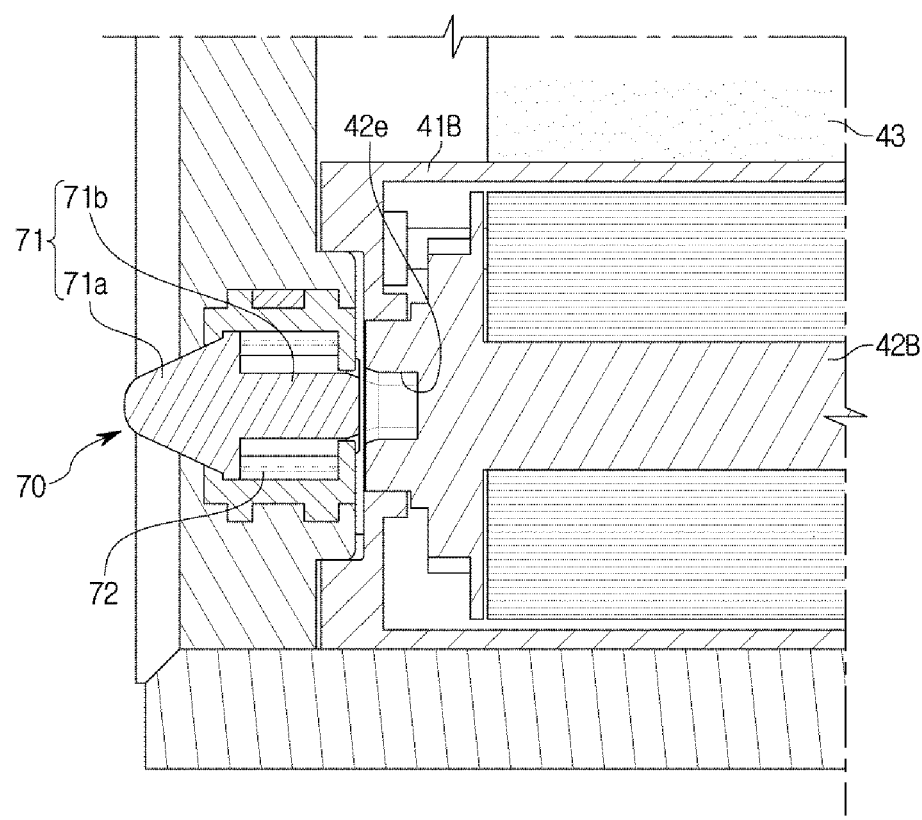
FIGS. 15 and 16 are cross-sectional views showing an operation of a coupling device applied to an air purifier according to the second embodiment of the present disclosure.
Figure 16:
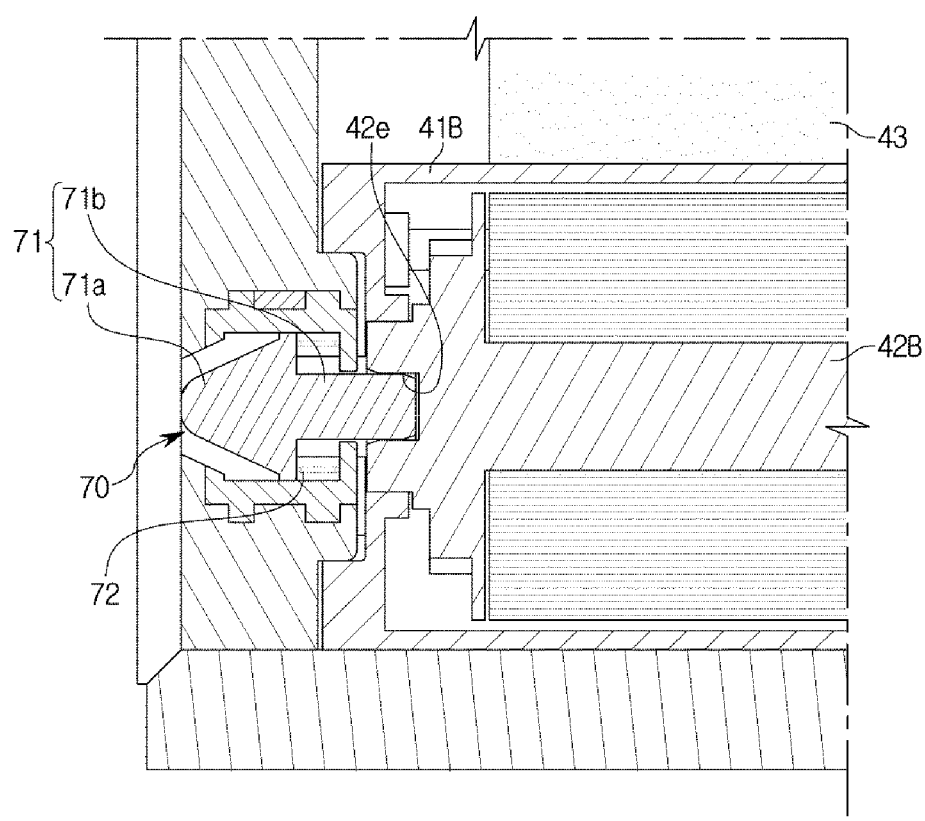

In addition, the main body 30, as shown in FIGS. 15 and 16, includes a coupling device 70 that selectively drives a drive device (not shown) to transmit power to the recovery roller 42B only when the suction cover 32 is installed.

As shown in FIG. 15, the coupling device 70 includes a coupler 71 formed in a conical shape and movably installed in the mounting part 31a of the main housing 31, and a coupler spring 72 elastically supporting the coupler 71. The recovery roller 42B includes a coupling groove 42e provided at one end opposite to the coupler 71 and engaged with the coupler 71.

The coupler 71 is connected to a drive device (not shown) and rotates by the drive device. The coupler 71 includes a guide part 71a for the coupler 71 to move inward as the suction cover 32 is mounted on the mounting part 31a and a coupling part 71b selectively coupled to the recovery roller 42B according to the position of the coupler 71.

The guide part 71a is formed in a conical shape, and one end of the guide part 71a corresponding to the vertex penetrates the mounting part 31a and protrudes outward. Gears are formed on the outer circumferential surface of the coupling part 71b and the inner circumferential surface of the coupling groove 42e, respectively.

Before the suction cover 32 is mounted on the mounting part 31a, the coupler 71 is elastically supported by the coupler spring 72, and the guide part 71a of the coupler 71 maintains a protruding state outside the mounting part 31a.

As shown in FIG. 16, when the suction cover 32 is mounted on the mounting part 31a, since the guide part 71a is pressed by the suction cover 32, the coupler 71 moves inside the mounting part 31a. As the coupler 71 moves, the coupling part 71b is coupled to the coupling groove 42e. Since gears are formed on the outer circumferential surface of the coupling part 71b and the inner circumferential surface of the coupling groove 42e, the gear of the coupling part 71b and the gear of the coupling groove 42e are engaged so that power can be transmitted.

Therefore, when the coupler 71 is rotated by the drive device while the coupling part 71b is coupled to the coupling groove 42e, the recovery roller 42B rotates together with the coupler 71.

In the above, the supply housing 40A and the recovery housing 40B maintain a state coupled to each other by a magnetic force, but this is an example and is not limited thereto. That is, it is also possible to allow the supply housing and the recovery housing to be detachably coupled in a snap-fit manner through a hook or the like, or to maintain the state of being coupled to each other by adhesive tape.

Figure 17:
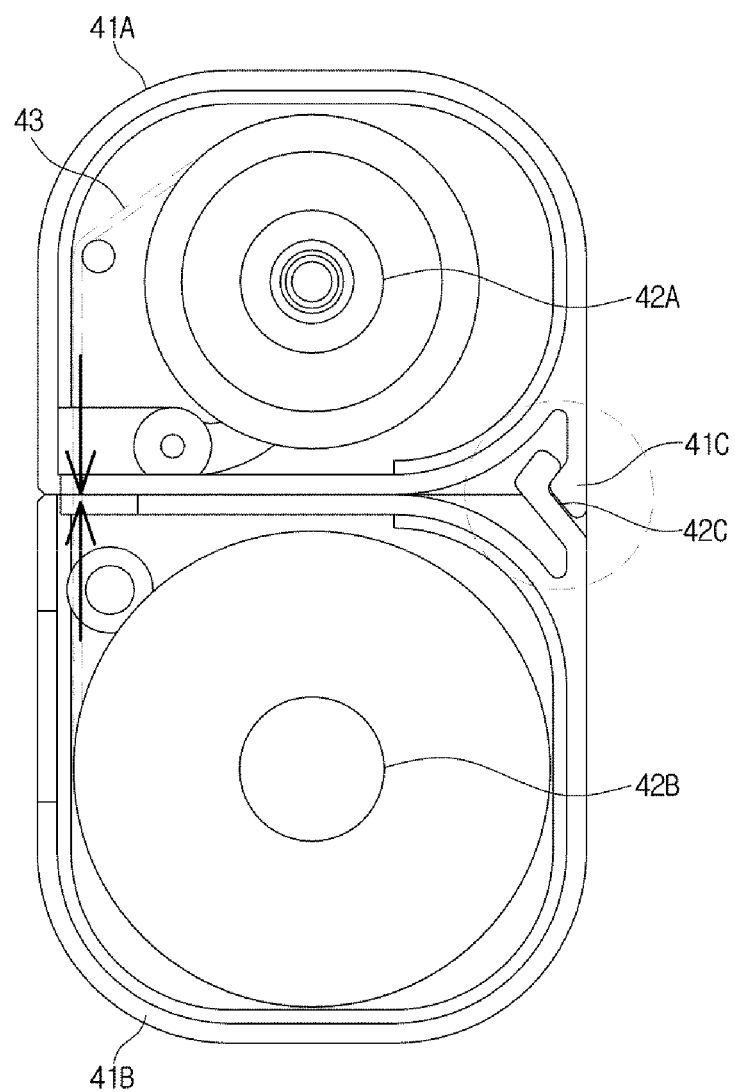
FIG. 17 is a cross-sectional view of a filter module applied to an air purifier according to a third embodiment of the present disclosure.

In addition, as shown in FIG. 17 as the third embodiment, one side of the supply housing 41A and the recovery housing 41B may maintain a state supported by each other by the tension of the pre-filter 43 wound on the supply roller 42A and the recovery roller 42B, and the other side of the supply housing 41A and the recovery housing 41B may maintain a state coupled in a snap-fit manner by a hook 41c and a groove 42c.

Hereinafter, the process of replacing the filter module in the air purifier will be described.

When the filter module 40 needs to be replaced, the suction cover 32 is separated from the main housing 31 so that the opening 30a of the main housing 31 is exposed. In this state, the filter module 40 installed in the main housing 31 is separated.

Next, the new filter module 40 before use is prepared. The filter module 40 before use is stored with the supply housing 40A and the recovery housing 40B combined with each other.

After separating the supply housing 40A and the recovery housing 40B of the new filter module 40 from each other by applying force just before being installed on the main body 30, the supply housing 40A and the recovery housing 40B are separated by a predetermined distance, so that the pre-filter 43 section between the supply housing 40A and the recovery housing 40B forms the collecting part.

With the collecting part formed in this way, the installation of the filter module 40 is completed by installing the supply housing 40A and the recovery housing 40B inside the opening 30a of the main housing 31 through the coupling guides 31b and 31c, and by recoupling the suction cover 32 to the main housing 31.

Figure 18:
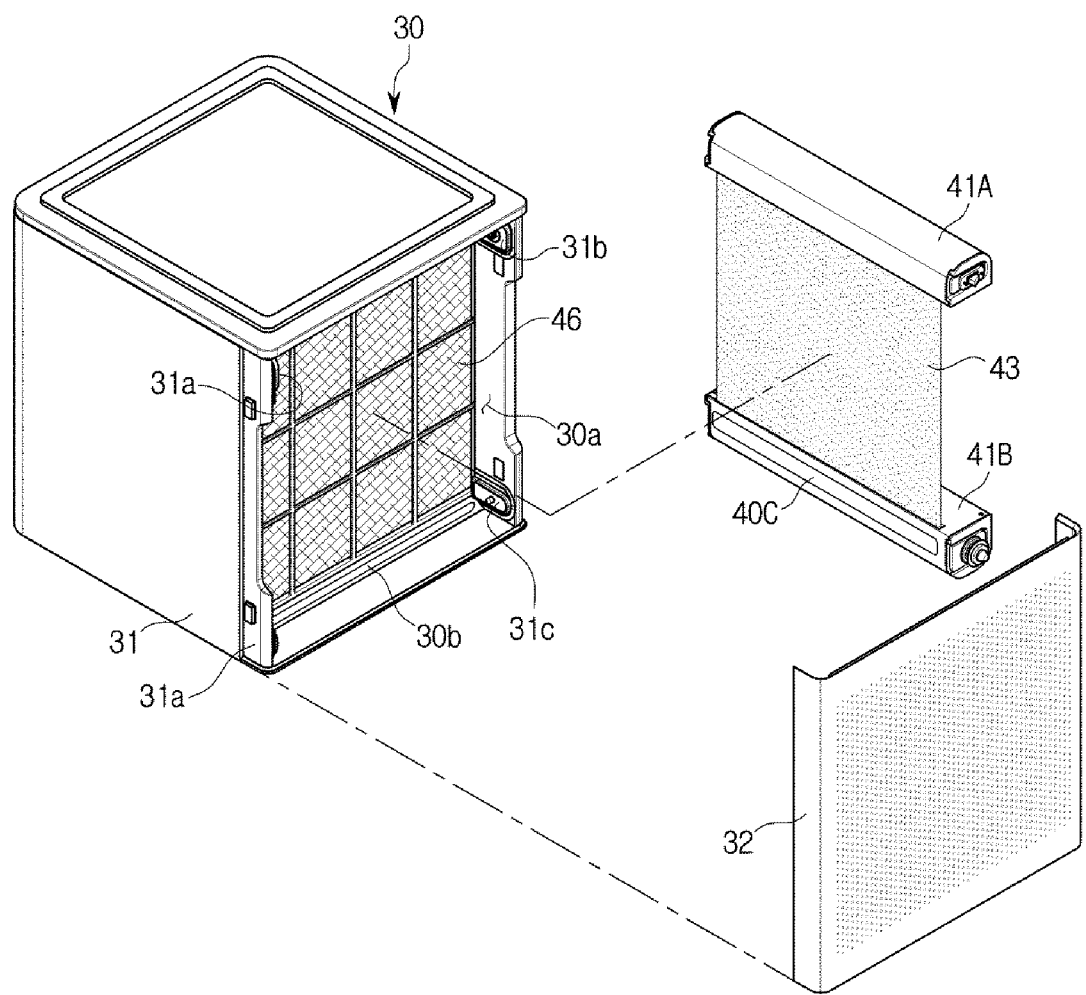
FIG. 18 is an exploded perspective view of an air purifier according to a fourth embodiment of the present disclosure.

In addition, FIG. 18 discloses the air purifier according to a fourth embodiment of the present disclosure.

The air purifier according to the third embodiment of the present disclosure includes the main body 30, the filter module 40, and the suction cover 32 of substantially the same type as the second embodiment.

Also, the air purifier includes an ultraviolet lamp 33 disposed on the lower front surface of the main body 30 to irradiate ultraviolet light toward the front side, and the recovery housing 41B includes a transparent window 41d provided to correspond to the ultraviolet lamp 33 on its rear surface. The ultraviolet lamp 33 and the transparent window 41d are extended to the left and right to correspond to the width of the pre-filter 43.

When configured in this way, the ultraviolet light generated from the ultraviolet lamp 33 is irradiated to a part of the pre-filter 43 wound on the recovery roller 42B through the transparent window 41d. Since the ultraviolet light has sterilizing power, a part of the filter part 43a recovered on the recovery roller 42B is sterilized by the ultraviolet light. Therefore, the filter module 40 can be used hygienically for a long period of time.

Although a few embodiments of the disclosure have been shown and described, it would be appreciated by those skilled in the art that changes may be made in these embodiments without departing from the principles and spirit of the disclosure, the scope of which is defined in the claims and their equivalents.

The invention claimed is:

1. An air purifier comprising:
   a main body comprising an inlet through which air is sucked; and
   a filter module installed to be replaceable inside the inlet, wherein:
   the filter module comprises a supply roller and a recovery roller, and a filter on which two ends of the filter are wound and installed on the supply roller and the recovery roller;
   the main body further comprises a main housing having an opening on a front surface of the main housing, and a suction cover having the inlet of the main body and the suction cover is detachably installed in a mounting portion of the main housing to cover the opening of the main housing;

the filter module further comprises a supply housing covering the supply roller, a recovery housing covering the recovery roller, and a rewind device that allows the filter to rewind the supply roller;

the main body further comprises a rewind release device that allows rewinding of the filter to be stopped;

the rewind device comprises:
- a locking member rotatably installed on the supply roller, the locking member including a locking part in which a gear is formed on its outer circumferential surface;
- a rewind spring elastically supporting the locking member in the circumferential direction; and
- a locking hole formed on the supply housing to limit a rotation of the locking member; and the rewind release device comprises:
- a release pin movably installed in the mounting part of the main housing; and
- a release spring elastically supporting the release pin.

2. The air purifier according to claim 1, further comprising:
a drive device configured to drive the supply roller and the recovery roller,
wherein the drive device comprises a drive motor configured to generate a rotational force, a drive pulley connected to an axis of the drive motor, a driven pulley connected to an axis of the recovery roller, and a timing belt configured to transmit the rotational force from the drive pulley to the driven pulley.

3. The air purifier according to claim 1, wherein the filter module further comprises a latch device disposed on at least one of the supply roller and the recovery roller to limit reverse rotation.

4. The air purifier according to claim 3, wherein the latch device comprises a latch gear connected to any one axis of the supply roller and the recovery roller, a latch lever engaged the latch gear to limit the reverse rotation of the latch gear, and a latch spring elastically supporting the latch lever.

5. The air purifier according to claim 1, wherein the filter module further comprises a filter housing in which the supply roller and the recovery roller are rotatably installed, and
wherein the filter housing comprises a supply part accommodating the supply roller, a recovery part accommodating the recovery roller, and an opening provided to correspond to the inlet between the supply part and the recovery part.

6. The air purifier according to claim 5, wherein the filter comprises a filter part configured to collect foreign substances, and two cover parts connected to two ends of the filter part to cover the opening.

7. The air purifier according to claim 1, wherein the filter is selected from the group consisting of at least one of a pre-filter, a HEPA filter, a deodorizing filter and an antibacterial filter.

8. The air purifier according to claim 1, wherein the main body further comprises an electrostatic filter disposed in front of the filter.

9. The air purifier according to claim 8, wherein the filter comprises a pre-filter, and the filter module further comprises a HEPA filter disposed behind the pre-filter.

10. The air purifier according to claim 1, wherein the main body further comprises a movable housing provided with the inlet of the main body on a front surface and movably installed in the opening of the main housing.

11. The air purifier according to claim 10, wherein the movable housing comprises a filter installation part provided in a slot shape on a side of the movable housing and in which the filter module is detachably installed.

12. The air purifier according to claim 1, wherein the recovery housing is detachably coupled to the supply housing.

13. The air purifier according to claim 1, wherein the filter module comprises permanent magnets disposed in the supply housing and the recovery housing, respectively.

14. The air purifier according to claim 1,
wherein the supply housing and the recovery housing are detachably coupled inside the opening.

15. The air purifier according to claim 14, wherein the main body comprises an ultraviolet lamp provided at the bottom of the front surface, and
the recovery housing comprises a transparent window provided at a position corresponding to the ultraviolet lamp.

* * * * *